March 17, 1936.                    E. J. LAUTERBUR                    2,034,346
              COMBINATION DOUGH BRAKE AND FLAT DOUGH MOLDER
                      Filed Jan. 16, 1933          2 Sheets-Sheet 2

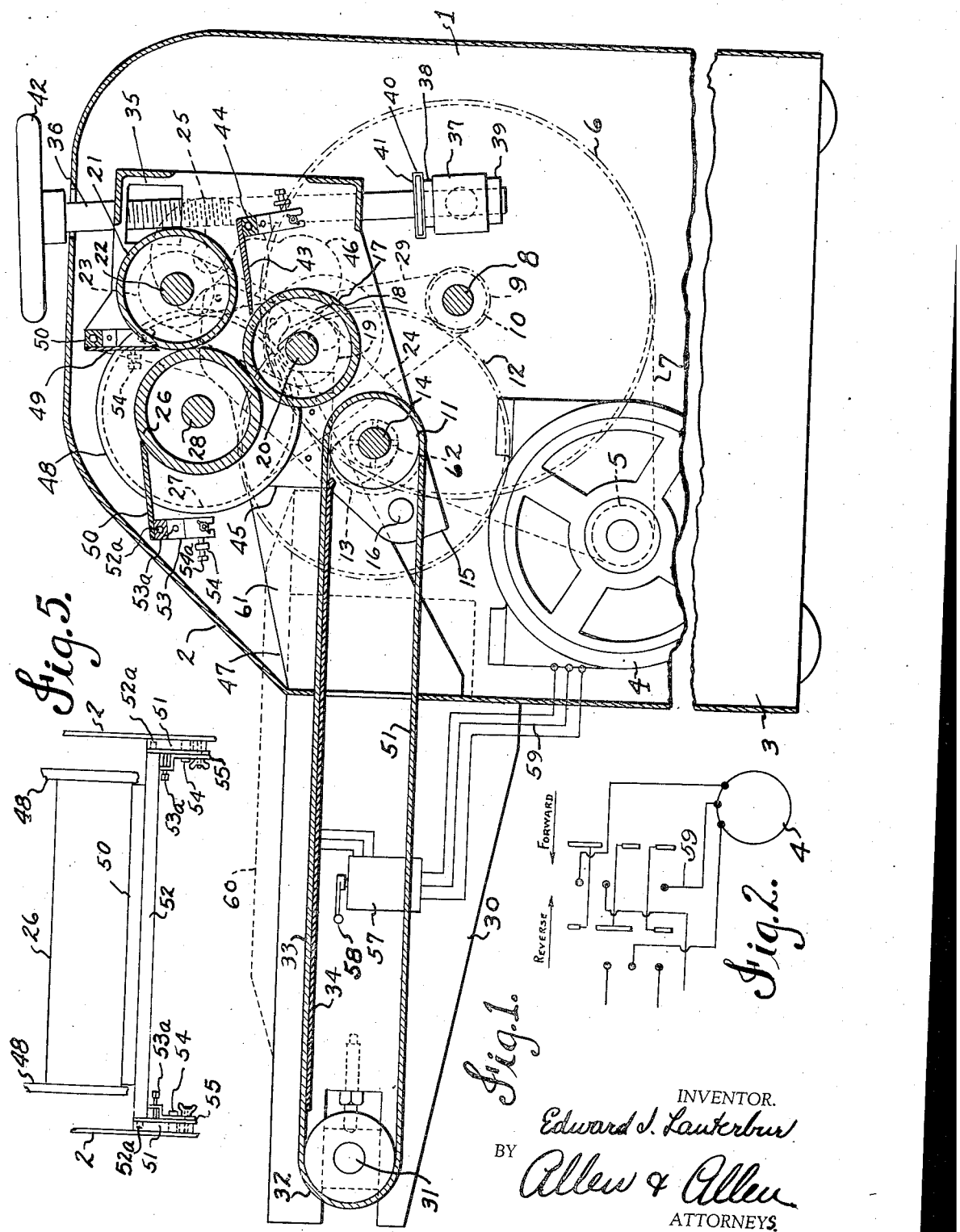

INVENTOR.
Edward J. Lauterbur
BY Allen & Allen
ATTORNEYS

Patented Mar. 17, 1936

2,034,346

UNITED STATES PATENT OFFICE 2,034,346

COMBINATION DOUGH BRAKE AND FLAT DOUGH MOLDER

Edward J. Lauterbur, Sidney, Ohio

Application January 16, 1933, Serial No. 651,921

11 Claims. (Cl. 107—12)

My invention relates to dough working machinery, and more especially to dough molders and flat dough brakes. A dough molder operates upon pieces of dough which usually are relatively small, and often each piece is operated upon but once by the mechanism. The less worked dough produced by the flat dough molder is used for coffee cake, turnovers and the like. A dough brake usually operates upon larger pieces of dough several times, depending upon the results desired; and between each operation usually the dough is folded and operated upon at right angles to the direction of each preceding operation.

It is my object to provide a machine which is especially rapid, easy and safe in operation as a dough brake, while providing ample facility for the usually less exacting operation as a flat dough molder.

A further object is to provide, by simple means, for adjustment to produce dough pieces of different thicknesses, or to afford different working pressures on a piece of given thickness, or for progressively reducing the thickness of the pieces, or for maintaining a given working pressure on pieces of various thicknesses, according to conditions.

A further object is to provide for driving the mechanism in either direction, for acting in one capacity or the other by reversing its driving motor, and to provide simple speed reduction mechanism by which the motor drives the machine, and to mount the motor, mechanisms and adjusting means together with a reversing and controlling device, in compact arrangement, with the motor enclosed. The machine may be constructed for floor or bench mounting.

Other objects will appear in the course of the following description, illustrated by the accompanying drawings, in which:—

Figure 1 is a sectional side elevation of a machine embodying my invention.

Figure 2 is a diagram of a conventional three-wire starting and reversing switch arrangement.

Figure 5 is a front elevation of one of the scrapers and its adjustable mounting.

Figure 3:
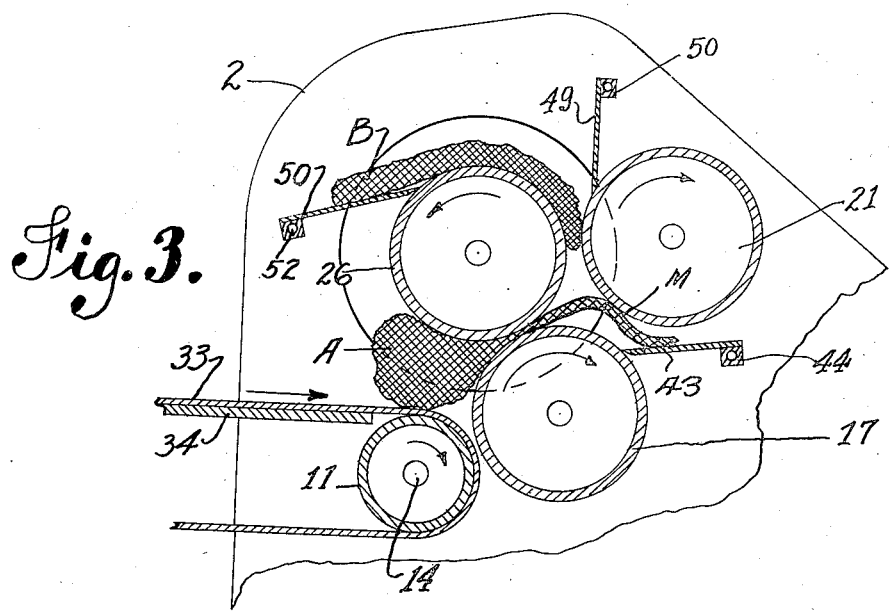
Figure 3 is a diagrammatic section corresponding to that of Figure 1, showing the operation as a dough brake.

In general, the machine comprises rolls on parallel axes, one below and two above, a conveyor at the front of the lower roll, and means for rotating the three rolls to feed dough upward and driving the conveyor toward the rolls, to catch the dough from the upper rolls and feed it to the rolls again, as a dough brake; or to rotate the rolls reversely and run the conveyor away from them, to carry away dough fed downward by the rolls, as a flat dough molder. The latter operation is sufficiently convenient because, as before explained, in a flat dough molder the pieces usually require but one passage. In the former operation, as a dough brake, the repeated passage is automatic, and is safe because the operator rotates and folds the dough at a safe distance from the rolls on the conveyor. A guide out over the conveyor from the upper rolls is preferably provided to cause the droppage of the dough onto the conveyor at such distance from the rolls.

Suitable guides are provided adjacent to the rolls to insure the desired passage of the dough, also acting as scrapers for the rolls. The guide for the upper front roll affords the extension out over the conveyor as just explained, when acting as a dough brake; and it forms a feed table from which the dough is fed manually between the upper rolls when acting as a flat dough molder.

The successive passages, with ninety degree rotation and folding of the pieces between passages, in the dough brake operation, alters the cellular structure of the dough, due to the folding, rolling and stretching action; and the dough is thereby rendered very pliable and of extremely close grain and white, even texture. The conveyor, running toward the rolls, permits the rotating and folding by the operator with entire safety, as no part of the operation requires the operator's hands or clothing to be near the moving parts of the mechanism other than the conveyor, which preferably is a simple belt conveyor. This makes it unnecessary to provide special safety device, such as trip switches, pull cords or the like. When a piece has had the requisite number of passages, the operator simply removes it from the conveyor as soon as it has dropped from the upper front roll guide.

In the flat dough molding operation the conveyor will carry the dough pieces away from the machine; the operator working at the upper roll guide, merely pushing the pieces backward onto the top of the upper front roll, with entire safety.

In the specific example as illustrated, a casing 1 has spaced sides 2 and a base 3 supporting, inside the casing at the front thereof, a motor 4 having a pulley 5 on its shaft which is belted to a much larger pulley 6 by a belt 7; the pulley 6 being fixed on a shaft 8 with a pinion 9 and a sprocket wheel 10. The shaft 8 is journaled transversely in the casing sides 2. Upward and forward from shaft 8, the rear conveyor drum 11, a large spur gear 12 and a sprocket wheel 13 are fixed on a shaft 14 mounted transversely in the sides 2 of the casing 1. The large spur gear 12 meshes with the pinion 9, so that the conveyor drum 11 is driven slowly, relative to the speed of the motor 4.

Yoke members 15 are pivoted on studs 16 fixed to the respective casing sides 2, received in their front end parts forward from the drum 11. These yokes 15 are slotted around the drum shaft 14 and extend rearwardly and upwardly to support the lower roll and the rear upper roll for adjustment relatively to the front upper roll, as will be described.

The lower roll 17 is located upwardly and to the rear of the conveyor drum 11, and is fixed, together with two sprocket wheels 18 and 19, on a transverse shaft 20 carried in the yoke members 15. The rear upper roll 21, together with a sprocket wheel 23, is fixed to the shaft 22, also carried in the yoke members 15. A sprocket chain 24 passing around the sprocket wheels 13 and 18, and a sprocket chain 25 passing around sprocket wheels 19 and 23, cause these rolls 17 and 21 to rotate together with and in the same direction as the conveyor drum 11.

The upper front roll 26, together with a large sprocket wheel 27, is fixed on a shaft 28 mounted in the casing sides 2. A sprocket chain 29 passes around sprocket wheels 27 and 10, so that this front upper roll 26 is rotated in direction opposite to that of the conveyor drum 11, and the other two rolls 17 and 21. The three rolls 17, 21, and 26 are so arranged that the upper front roll 26 is located slightly lower than the upper rear roll 21, and projects considerably forward from the lower roll, over the conveyor drum 11.

Conveyor frame members 30, extending forward from the front of the casing 1 near its sides 2, have in their front end parts adjustable bearings 31 supporting front conveyor drum 32. The conveyor belt 33 passes around the conveyor drum 11 and 32, and has its upper flight supported by plate 34, between the frame members 30. It is kept stretched by means of adjustable bearings 31.

The rear ends of the yoke members 15 are supported by having inwardly extended bosses 35, pivoted to them at their rear upper corners and threaded onto respective screw shafts 36, which extend below the yokes and are journaled in respective bosses 37 pivoted on the casing sides 2. Collars 38 and 39, pinned on the shafts 36 above and below the bosses 37 prevent axial movement of the shafts 36 in these bosses; so that turning of the shafts 36 moves the yokes 15 up or down by means of the threaded connections at the yoke bosses 35. These two shafts 36 are connected to rotate in unison by sprocket wheels 40 fixed on the respective shafts just above their upper collars 38, and a sprocket chain 41 passing around the wheels 40. One of the shafts 36 extends out of the top of the casing 1 and has fixed on it a hand wheel 42, which when turned operates both shafts in the manner just described. This operation thus swings the yoke members 15 in unison to swing the lower roll 17 and upper rear roll 21 toward or from the upper front roll 26, to vary the thickness of pieces rolled, or the pressure on a given thickness, as before referred to.

A scraper 43 pivoted at 44 on the yoke members 15, functions on the lower roll 17, being held adjustably to the roll nearly at a horizontal tangent thereto. It retards the advancing end of the dough piece, causing it to buckle upward into contact with the upper rear roll 21 and thereby be drawn in a folded condition up between upper rolls 21 and 26, as seen in Fig. 3 at M. To fully enclose the path of the dough between the rolls 17, 21 and 27 in either direction, guide plates 45 and 46 are supported on an arm 47 extending from conveyor frame 30. Front upper roller 26 has end flanges 48 lapping the ends of the other two rolls 17 and 21; and these guide plates fit the contours of these flanges.

At the front upper part of roll 21 is a scraper 49, extending down closely in front of this roll and acting as a guide insuring passage of dough between rolls 21 and 26 in either direction. At the upper front part of front upper roll 26 is the scraper 50, presenting its rear edge to the roll 26. It preferably inclines downward in its forward extent from the roll, and it forms a feed table for feeding dough pieces back over roll 26, or it receives the pieces as they come from the rolls, and guides the pieces out forwardly to fall on the conveyor belt 33.

The flanges of the upper roll 26 also lap the ends of the scrapers 49 and 50. All three scrapers 43, 49, and 50 are mounted for swinging adjustment to the respective rolls. As shown in Fig. 5, illustrating the mounting of scraper 50 of front upper roll 26, bearing blocks 51 project in from the frame sides 2, and a bar 52 on which the scraper is fixed has pivots 52a in the respective blocks. Lugs 53 on the end parts of the bar 52 have threaded laterally through them screws 53a against the blocks 51 to centralize the scraper between the roll flanges 48. Wings 55 extend down from these lugs 53 and have slots in their ends, and studs, narrower than the slots, project from the blocks 51 through these slots, receiving wing nuts 56 to clamp the wings 55, holding the scraper in its adjusted relation to the roll. A lug 54 projects in from frame side 2 in front of one wing 55, with a lock screw 54a threaded through it against the edge of the wing. This permits exact replacement of the scraper when removed for cleaning. It will be understood that the mountings of the other two scrapers 43 and 49, in the yokes 15, are similar to the one just described.

At one side of the front of the machine is the switch casing 57, with a conventional three-wire reversing switch having handle 58 and connected by wiring 59 in a usual manner as shown diagrammatically in Fig. 2, with the motor 4 in such manner that with handle in middle motor is stopped, and when thrown to one side or the other, motor is driven in one or the other direction.

Figure 4:
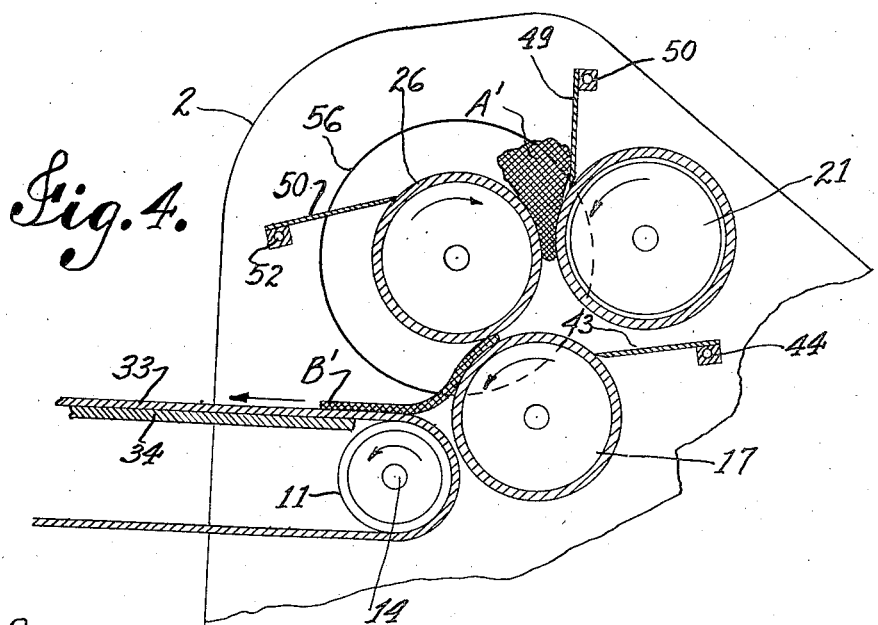
Figure 4 is a similar view showing the operation as a flat dough molder.
Figure 6:
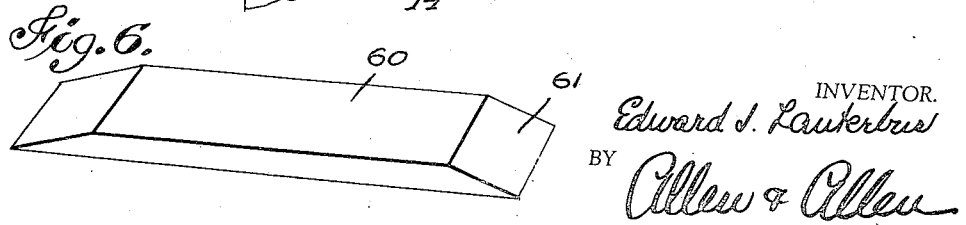
Figure 6 is a perspective view of the pan shown in Figure 1.

In the dough molder operation of Figure 4, the rolls rotate over forwardly with the upper flight of conveyor belt 33 traveling toward them; and piece of dough A' is fed from table 55 to emerge as flat piece B' onto the conveyor belt, to be carried away thereby. The lower roll 19, being set back under and up slightly in back of the upper front roll 26, which overhangs the conveyor 33, makes the machine especially safe against insertion of the operator's hand between the rolls 19 and 26.

In the dough brake operation as shown in Figure 3, rolls 17 and 21 rotate over backwardly, and the upper flight of conveyor belt 33 travels backward toward the rolls, while upper front roll 26 rotates over forwardly. The piece of dough A is carried by the conveyor to pass between the rolls and emerge as flattened piece B on the top guide 55 to fall to the conveyor for again entering between the rolls. This flattened piece B will fall on the conveyor so as to fold, and the operator may simply give the folded strip a quarter turn as the strip is passing back for the next passage between the rolls.

It is sometimes desirable to afford a stationary surface onto which the strip B may fall, to allow the operator ample time for handling the strip as just described. I may provide for this by a cover in the form of an inverted pan 60 resting on the conveyor frame, with sloping inner end 61. The operator then pushes the piece B off onto the conveyor belt 33, which carries it to the rolls as before described. As a different provision for this purpose, I may connect conveyor driving roll 11 with its shaft 14 by a clutch 62, which may be released to stop the conveyor while the operator prepares the piece B for repassage upon starting the conveyor again.

So far as I am aware, I am the first to provide a conveyor feeding a dough brake, and to provide for repeated automatic passage of the piece of dough through the brake. I have illustrated and described an example of my invention especially adapted for optional use for one operation or the other by reversal of direction of operation. But it will be understood that my invention comprehends apparatus provided for only one operation or the other in which the advantages of my improvements are attained. Modifications may arise in the construction of a single purpose machine, as well as in the combination machine, and I do not wish to be understood as being limited to the exact disclosures herein, but what I claim as new and desire to secure by Letters Patent is:—

1. In a machine of the character described, comprising a plurality of coacting rollers, a member to lie along a face of one of said rolls, a pivotal mounting for said member whereon it may be swung toward or from the roll, or may be moved parallel with the axis of the roll, and devices for setting said member at various adjustments in its swinging movement and in its movement parallel with said axis.

2. In a machine of the character described, a conveyor comprising a rotary driving member, a lower roll at the rear of said driving member, front and rear upper rolls, driving means, an operative connection from said driving means to said conveyor driving member, means operatively connecting the conveyor driving member and the lower and rear upper rolls, and means operatively connecting the driving means and the front upper roll.

3. In a machine of the character described, a conveyor comprising a rotary driving member, a support swinging on a mounting near said driving member, a lower roll at the rear of said driving member, front and rear upper rolls, said lower roll and said rear upper roll being carried on said swinging support for adjustment toward and away from said front upper roll, driving means, an operative connection from said driving means to said conveyor driving member, means operatively connecting the conveyor driving member and the lower and rear upper rolls, and means operatively connecting the driving means and the front upper roll.

4. In a machine of the character described, driving means, a rotary conveyor driving member, a lower roll, a rear upper roll and a front upper roll, a releasable operative connection from said driving means to said conveyor driving member, and means operative independently of said releasable operative connection, operatively connecting said driving means to said rolls.

5. In a machine of the character described, a lower roll and an upper rear roll, a conveyor at the front of said lower roll, a front upper roll, means for varying the spacing between said front upper roll and the lower and rear upper rolls, and means for driving said rolls and said conveyor whereby the adjacent surfaces of the rolls and the effective conveying surface of the conveyor all move in the same conveying direction.

6. In a machine of the character described, a lower roll and a rear upper roll, a conveyor at the front of said lower roll, material guiding means adjacent to said rolls, an upper front roll having flanges at its ends lapping across the sides of the lower roll and rear upper roll and the guiding means, and means for driving said rolls and said conveyor whereby the adjacent surfaces of the rolls and the effective conveying surface of the conveyor all move in the same conveying direction.

7. In a machine of the character described, a lower roll and a rear upper roll, a conveyor at the front of said lower roll, material guiding means adjacent to said rolls, an upper front roll having flanged at its ends lapping across the sides of the lower roll and rear upper roll and the guiding means, guide means conforming to said flanges at the sides of said conveyor and ends of said lower roll and rear upper roll, and means for driving said rolls and said conveyor whereby the adjacent surfaces of the rolls and the effective conveying surface of the conveyor all move in the same conveying direction.

8. In a machine of the character described, a lower roll and an upper rear roll, a conveyor at the front of said lower roll, an upper front roll overhanging said conveyor, means removably and stationarily mounted over said conveyor to receive material from said front upper roll for manual feeding to said conveyor, and means for driving said rolls and said conveyor whereby the adjacent surfaces of the rolls and the effective conveying surface of the conveyor all move in direction to convey material from the conveyor to said upper front roll.

9. In a machine of the character described, a lower roll, a conveyor adjacent to said lower roll, front and rear upper rolls, a reversible motor, and means operatively connecting said motor to said rolls and said conveyor whereby the motor causes the adjacent surfaces of the rolls and the effective conveying surface of the conveyor all to move in one or the other conveying direction, accordingly as the motor runs in one direction or the other.

10. In a machine of the character described, dough elevating and pressing mechanism and a conveyor, a reversible motor operating said conveyor and said mechanism in one direction or the other to feed dough from the conveyor to the lower part of the mechanism, or to feed dough downwardly from the upper part of the mechanism to the conveyor to be carried thereby away from the mechanism.

11. In a machine of the character described, apparatus comprising a lower roll and two upper rolls meeting over the lower roll, said rolls being rotated in such directions that the lower roll and one upper roll initially draw material in between them and then the two upper rolls draw the material in between them, and means between the lower roll and the second upper roll allowing passage of the material for a substantial distance between said lower and second upper rolls but retarding the advanced portion of the material relative to the portion yet being passed between the lower roll and said one upper roll, whereby the material is buckled upward and by contact with the bottom of said second upper roll is drawn in folded condition up between said upper rolls.

EDWARD J. LAUTERBUR.